United States Patent
Kondou et al.

(10) Patent No.: US 9,800,106 B2
(45) Date of Patent: Oct. 24, 2017

(54) ROTOR

(71) Applicants: DAIKIN INDUSTRIES, LTD., Osaka-shi, Osaka (JP); OSAKA PREFECTURE UNIVERSITY PUBLIC CORPORATION, Sakai-shi, Osaka (JP)

(72) Inventors: Toshinari Kondou, Osaka (JP); Masayuki Sanada, Osaka (JP); Shigeo Morimoto, Osaka (JP); Yukinori Inoue, Osaka (JP)

(73) Assignees: DAIKIN INDUSTRIES, LTD., Osaka-Shi (JP); OSAKA PREFECTURE UNIVERSITY PUBLIC CORPORATION, Sakai-Shi (JP)

( * ) Notice: Subject to any disclaimer, the term of this patent is extended or adjusted under 35 U.S.C. 154(b) by 0 days.

(21) Appl. No.: 15/122,476

(22) PCT Filed: Mar. 4, 2015

(86) PCT No.: PCT/JP2015/001145
§ 371 (c)(1),
(2) Date: Aug. 30, 2016

(87) PCT Pub. No.: WO2015/133134
PCT Pub. Date: Sep. 11, 2015

(65) Prior Publication Data
US 2017/0063185 A1 Mar. 2, 2017

(30) Foreign Application Priority Data

Mar. 4, 2014 (JP) .................. 2014-042061

(51) Int. Cl.
*H02K 21/12* (2006.01)
*H02K 1/27* (2006.01)
*H02K 1/02* (2006.01)

(52) U.S. Cl.
CPC .............. *H02K 1/276* (2013.01); *H02K 1/02* (2013.01); *H02K 2213/03* (2013.01)

(58) Field of Classification Search
CPC ... H02K 1/276; H02K 1/2766; H02K 2213/03
(Continued)

(56) References Cited

U.S. PATENT DOCUMENTS

| 6,008,559 A | 12/1999 | Asano et al. |
| 2009/0102306 A1* | 4/2009 | Nishijima ............ H02K 1/276 310/156.53 |

(Continued)

FOREIGN PATENT DOCUMENTS

| JP | 11-98731 A | 4/1999 |
| JP | 2000-278895 A | 10/2000 |

(Continued)

*Primary Examiner* — Hanh Nguyen
(74) *Attorney, Agent, or Firm* — Birch, Stewart, Kolasch & Birch, LLP

(57) ABSTRACT

Satisfactory magnet torque is achieved while avoiding a reduction in the reluctance torque generated. The rotor core is provided with a plurality of magnet slots arranged in the circumferential direction of the rotor core and a gap formed of base holes and a projecting hole. The base holes extend from both ends in the circumferential direction of each magnet slot to the outer side of the rotor core. The projecting hole projects in the circumferential direction of the rotor core from at least one of peripheral portions, opposed to each other, of the base holes provided at both of the ends of the magnet slot, when viewed in an axial direction. The projecting hole is located closer to the magnet slot than to an outer peripheral side end of the base hole.

20 Claims, 6 Drawing Sheets

(58) Field of Classification Search
USPC .......................... 310/156.53, 156.56, 156.57
See application file for complete search history.

(56) References Cited

U.S. PATENT DOCUMENTS

| | | | | |
|---|---|---|---|---|
| 2010/0026128 A1* | 2/2010 | Ionel | ...................... | H02K 1/276 |
| | | | | 310/156.53 |
| 2011/0163624 A1 | 7/2011 | Hori et al. | | |
| 2012/0112593 A1* | 5/2012 | Araki | ...................... | H02K 1/276 |
| | | | | 310/156.57 |
| 2012/0242182 A1* | 9/2012 | Yabe | ...................... | H02K 29/03 |
| | | | | 310/156.53 |
| 2012/0293033 A1 | 11/2012 | Hisada | | |
| 2013/0147304 A1* | 6/2013 | Kenji | ...................... | H02K 1/274 |
| | | | | 310/156.53 |

FOREIGN PATENT DOCUMENTS

| | | | |
|---|---|---|---|
| JP | 2007-060755 | A | 3/2007 |
| JP | 2008-187778 | A | 8/2008 |
| JP | 2011-142735 | A | 7/2011 |
| JP | 2012-085532 | A | 4/2012 |
| JP | 2012-120413 | A | 6/2012 |
| JP | 2012-130218 | A | 7/2012 |
| JP | 2012-210040 | A | 10/2012 |
| JP | 2012-249512 | A | 12/2012 |
| JP | 2013-055755 | A | 3/2013 |

\* cited by examiner

US 9,800,106 B2

ROTOR

TECHNICAL FIELD

The present invention relates to a structure of a rotor.

BACKGROUND ART

Interior Permanent Magnet Synchronous Motors (IP-MSMs) have a stator and a rotor. As disclosed in Patent Document 1, for example, the rotor has a rotor core provided with magnet implantable holes arranged at regular intervals in the circumferential direction, and permanent magnets buried in the implantable holes. The stator has a stator core around which coils are wound at a plurality of portions. The electric current passing through the coils generates rotating magnetic fields, which cause the rotor and the stator to repeatedly attract and repel each other, and accordingly, the rotor rotates with respect to the stator.

CITATION LIST

Patent Document

Patent Document 1: Japanese Unexamined Patent Publication No. H11-98731

SUMMARY OF THE INVENTION

Technical Problem

The rotor core according to Patent Document 1 is provided with holes for preventing a short circuit of magnetic flux, which extend from both ends in the circumferential direction of each magnet implantable hole toward the outer periphery of the rotor core and which is arranged along the outer periphery of the rotor core. The holes for preventing a short circuit of magnetic flux allow concentrated flow of the magnet flux, which contributes to the magnet torque, from the permanent magnet to the outer periphery side of the rotor core. Further, the holes for preventing a short circuit of magnetic flux restrict the flow of d-axis flux generated by the winding wire which contributes to the reluctance torque.

However, q-axis flux generated by the winding wire which also contributes to the reluctance torque flows from the outer periphery side of the rotor core to the inner side of the rotor core. The q-axis flux flowing into the rotor core is interrupted by the holes for preventing a short circuit of magnetic flux since these holes are located particularly at such positions, in the magnetic path of the q-axis flux within the rotor core, at which the q-axis flux flows into the rotor core. This may reduce the q-axis flux, and hence reduce the reluctance torque generated based on a difference between a q-axis inductance and a d-axis inductance.

In view of the foregoing, it is therefore an object of the present invention to achieve satisfactory magnet torque while avoiding a reduction in the reluctance torque generated.

Solution to the Problem

A first aspect of the invention of the present disclosure is characterized by including: a rotor core (31) provided with a plurality of magnet implantable holes (32) arranged in a circumferential direction of the rotor core (31); and a permanent magnet (39) buried in each of the magnet implantable holes (32), wherein the rotor core (31) is further provided with a gap (34) formed of base holes (35) extending to an outer side of the rotor core (31) from both ends, in the circumferential direction, of each of the magnet implantable holes (32), and a projecting hole (36) which projects in the circumferential direction of the rotor core (31) from at least one of peripheral portions (35a, 35a), opposed to each other, of the base holes (35) provided at both of the ends of each of the magnet implantable holes (32), when viewed in an axial direction, and the projecting hole (36) is located closer to the magnet implantable hole (32) than to an outer peripheral side end (35b) of the base hole (35).

The rotor core (31) is provided with the magnet implantable holes (32) and the base holes (35) extending from both ends of each of the holes (32) to the outer side of the rotor core (31). That is, when viewed from the axial direction, the magnet implantable hole (32) and the base holes (35) form a shape that protrudes to the inner side of the rotor core (31). The rotor core (31) is further provided with the projecting holes (36) each as a portion that forms the gap (34) together with the base hole (35). The projecting hole (36) projects in the circumferential direction of the rotor core (31) from each of the peripheral portions (35a, 35a), opposed to each other, of the base holes (35) provided at both ends of each of the magnet implantable holes (32). Moreover, the projecting hole (36) is located closer to the magnet implantable hole (32), i.e., closer to the permanent magnet (39), than to the outer peripheral side end (35b) of the base hole (35).

As described above, the projecting hole (36) is not located at a position through which the q-axis flux $\Phi q$ generated by the winding wire flows into the rotor core (31), and therefore, the q-axis flux $\Phi q$ is not reduced by the projecting hole (36). Moreover, since the projecting hole (36) projects in the circumferential direction of the rotor core (31) from each of the peripheral portions (35a, 35a), opposed to each other, of the base holes (35), the projecting hole (36) restricts the flow of the d-axis flux $\Phi d$ generated by the winding wire, and also achieves concentrated flow of the magnet flux $\Phi m$ from the permanent magnet (39) to the outer side of the rotor core (31). Thus, the magnet torque generated by the magnet flux $\Phi m$ is satisfactory and a reduction in the reluctance torque generated based on the inductances of the q-axis flux $\Phi q$ and the d-axis flux $\Phi d$ may be prevented.

A second aspect of the present disclosure is an embodiment of the first aspect. In the second aspect, the rotor core (31) is provided with the projecting hole (36) that is continuous with the base hole (35).

In this configuration, the projecting hole (36) and the base hole (35) are formed in the rotor core (31) so as to be continuous with each other. Thus, so-called short-circuited magnetic flux leakage, which is part of the magnet flux $\Phi m$ separated from the flow of the magnet flux $\Phi m$ and passing through the gap (34), may be reduced. In addition, since the base hole (35) and the projecting hole (36) are continuous with each other, the base hole (35) and the projecting hole (36) are easily formed in the rotor core (31) in manufacturing the rotor (30).

A third aspect of the present disclosure is an embodiment of the first aspect. In the third aspect, the rotor core (31) includes a connecting portion (31b) which connects each of the peripheral portions (35a, 35a) and a base hole side peripheral portion (36c) of the projecting hole (36) which is associated with the peripheral portion (35a, 35a).

The larger the projecting hole (36) is, the more likely the projecting hole (36) will be expanded to the outer periphery side of the rotor core (31) due to the centrifugal force associated with the rotation of the rotor (30). This may also result in the expansion of the portion (31a) of the rotor core

(31) between the outer peripheral side end (35b) of the base hole (35) and the outer peripheral surface of the rotor core (31). In the third aspect, however, the connecting portion (31b) of the rotor core (31) separates the base hole (35) and the projecting hole (36) from each other. This configuration reduces the deformation of the projecting hole (36) due to the centrifugal force, and hence the deformation of the bridge portion (31a) of the rotor core (31).

A fourth aspect of the invention is an embodiment of any one of the first to third aspects. In the fourth aspect, the projecting hole (36) in is a semicircular shape when viewed in the axial direction.

In this aspect of the disclosure, the projecting hole (36) is in a semicircular shape without a corner, when viewed in the axial direction. This may prevent local magnetic flux saturation which can occur in the case where the projecting hole (36) is in a shape having a corner, and may also achieve smooth flow of the q-axis flux Φq generated by the winding wire.

A fifth aspect of the present disclosure is an embodiment of any one of the first to fourth aspects. In the fifth aspect, the rotor core (31) is made of a magnetic material of which saturated magnetic flux density is greater than or equal to 2.3 T.

Thus, high torque is generated at the rotor (30) during rotation.

A sixth aspect of the present disclosure is an embodiment of any one of the first to fifth aspects. In the sixth aspect, the projecting hole (36) has a projection length (w1) greater than a width (w2) of the base hole (35) in the circumferential direction.

This may reduce the so-called short-circuited magnetic flux leakage which is part of the magnet flux Φm separated from the flow of the magnet flux Φm and passing through the gap (34).

A seventh aspect of the present disclosure is an embodiment of any one of the first to sixth aspects. In the seventh aspect, the projecting hole (36) is provided so as to be associated with only the base hole (35) located on a forward side in a rotational direction of the rotor core (31), of the base holes (35) provided at both of the ends of each of the magnet implantable holes (32).

Thus, the flow of the q-axis flux Φq generated by the winding wire is not interrupted near the outer peripheral surface of the rotor core (31) corresponding to the base hole (35) on the forward side in the rotational direction of the rotor core (31). Further, concentrated flow of the magnet flux Φm from the permanent magnet (39) to the outer side of the rotor core (31) may be achieved. Consequently, the magnetic flux density generated in the air gap (G) may be increased, which therefore allows an increase in the magnet torque generated by the magnet flux Φm and the reluctance torque generated based on the q-axis inductance.

Advantages of the Invention

According to the first aspect of the present disclosure, the magnet torque generated by the magnet flux Φm is satisfactory and a reduction in the reluctance torque generated based on the inductances of the q-axis flux Φq and the d-axis flux Φd may be prevented.

According to the second aspect of the present disclosure, the so-called short-circuited magnetic flux leakage may be reduced, and the base hole (35) and the projecting hole (36) are easily formed in the rotor core (31) in manufacturing the rotor (30).

According to the third aspect of the present disclosure, the deformation of the projecting hole (36) due to the centrifugal force may be reduced, and hence the deformation of the portion (31a) of the rotor core (31) may be reduced.

According to the fourth aspect of the present disclosure, local magnetic flux saturation which can occur in the case where the projecting hole (36) is in a shape having a corner may be prevented, and the smooth flow of the q-axis flux Φq generated by the winding wire may be achieved.

According to the fifth aspect of the present disclosure, high torque may be generated at the rotor (30) during rotation.

According to the sixth aspect of the present disclosure, the so-called short-circuited magnetic flux leakage may be reduced.

According to the seventh aspect of the present disclosure, the magnet torque generated by the magnet flux Φm and the reluctance torque generated based on the q-axis inductance may be increased.

DESCRIPTION OF EMBODIMENTS

Embodiments of the present invention will be described in detail below based on the drawings. The following embodiments are merely preferred examples in nature, and are not intended to limit the scope, applications, or use of the invention.

First Embodiment

<Configuration of Motor>

Figure 1:
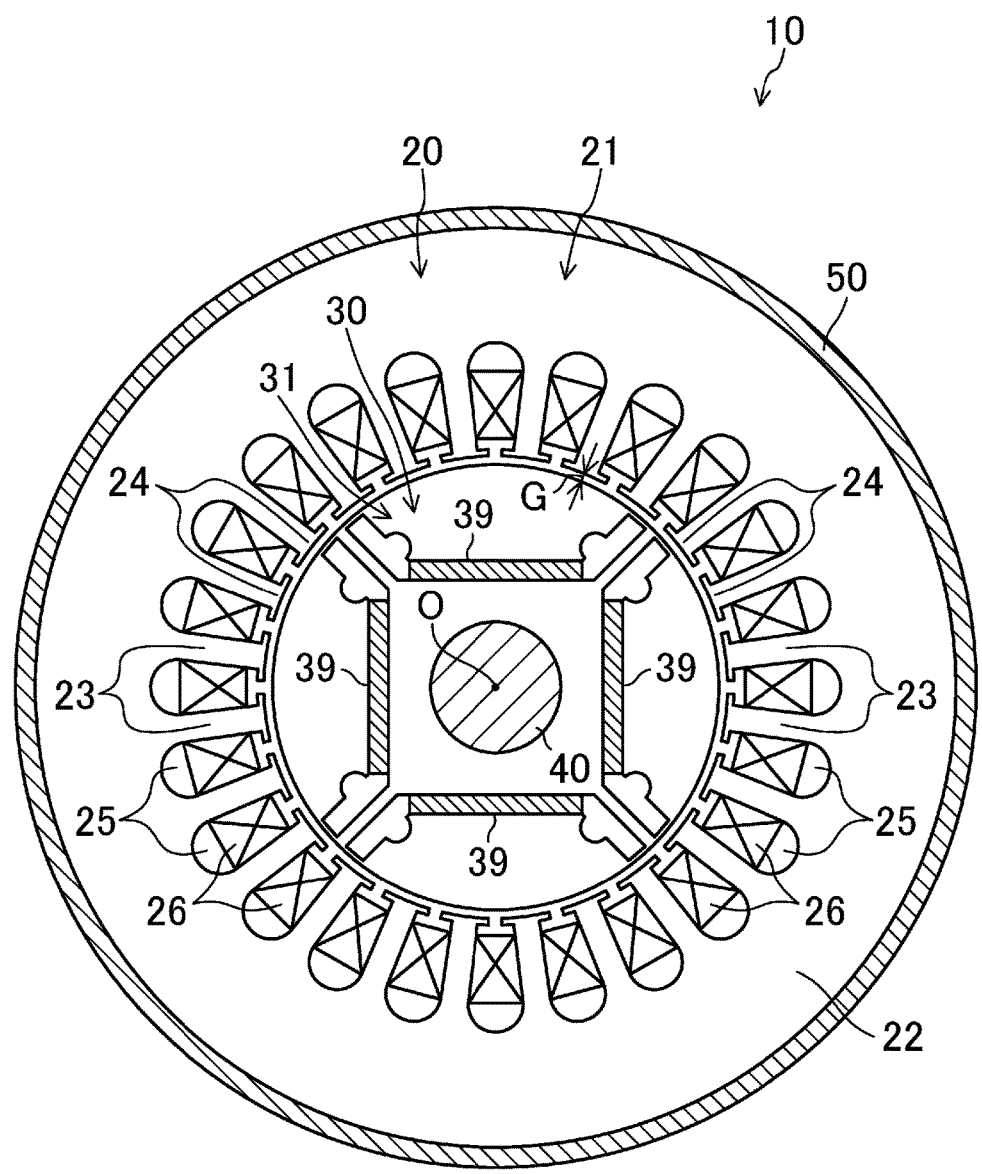
FIG. 1 is a horizontal cross-sectional view of a motor having a rotor according to a first embodiment.

FIG. 1 is a horizontal cross-sectional view of a motor (10) having a rotor (30) according to a first embodiment of the present invention. The motor (10) is used, for example, as a motor of a compressor of an air conditioner.

The motor (10) is a so-called interior permanent magnet synchronous motor (i.e., an IPMSM) in which magnets are buried in the rotor (30). As illustrated in FIG. 1, the motor (10) includes a stator (20), the rotor (30) and a drive shaft (40), and is housed in a casing (50) of the compressor.

In the following description, terms such as "axial direction," "radial direction," "outer side" and "inner side" are used as appropriate. The "axial direction" is a direction in which the rotational axis of the motor (10) extends, which is a direction in which the center (O) of the drive shaft (40) extends. The "radial direction" is a direction orthogonal to the center (O), specifically, the direction of radius of the motor (10). The "outer side" is a side farther from the center (O). The "inner side" is a side closer to the center (O).

<Configuration of Stator>

As illustrated in FIG. 1, the stator (20) includes a cylindrical stator core (21) and a coil (26).

The stator core (21) is a multilayered core obtained by layering, in the axial direction, a large number of flat multilayer plates blanked out from a magnetic steel sheet by press work. As illustrated in FIG. 1, the stator core (21) includes a single back-yoke portion (22), a plurality of tooth portions (23), and a plurality of flange portions (24).

The tooth portions (23) are radially-extending rectangular parallelepiped portions of the stator core (21). The plurality of tooth portions (23) are arranged at approximately regular intervals from one another in a circumferential direction of the stator core (21). The space between adjacent tooth portions (23) is a coil slot (25) in which a coil (26) is accommodated.

The back-yoke portion (22) has an annular shape. The back-yoke portion (22) connects the tooth portions (23) to one another at the outer side of the tooth portions (23). The outer periphery of the back-yoke portion (22) is fixed to an inner surface of the casing (50) of the compressor.

The flange portions (24) are serially arranged on the inner side of the tooth portions (23). The length of each of the flange portions (24) in the circumferential direction of the stator core (21) is longer than the length of each of the tooth portions (23) in the circumferential direction. The inner side surfaces of the plurality of flange portions (24) are cylindrical surfaces when viewed from the axial direction. Those cylindrical surfaces are opposed to the outer peripheral surface of a rotor core (31), which will be described later, with a predetermined distance therebetween. This predetermined distance is called an air gap (G).

The coil (26) is wound around the tooth portions (23). The typical techniques of winding the coil (26) include distributed winding and concentrated winding.

<Configuration of Rotor>

As illustrated in FIG. 1, the rotor (30) includes the cylindrical rotor core (31) and a plurality of permanent magnets (39). The rotor (30) has a cylindrical shape extending in the axial direction. The rotor (30) causes the permanent magnets (39) to generate magnet torque, and the rotor core (31) to generate reluctance torque, as well.

In the first embodiment, the rotor (30) has four magnetic poles, for each of which the permanent magnet (39) is arranged. The permanent magnets (39) are buried in magnet slots (32) formed in the rotor core (31). The magnet slots (32) will be described later.

The rotor core (31) is a multilayered core obtained by layering, in the axial direction a plurality of multilayer plates blanked out from a magnetic steel sheet by press work. The magnetic steel sheet used as a magnetic material for the rotor core (31) of the first embodiment has a saturated magnetic flux density of greater than or equal to 2.3 T. Examples of the magnetic material include a silicon steel plate and permendur.

The rotor core (31) is provided with a hole at its center. The hole is used to attach the drive shaft (40). The rotor core (31) is fitted and fixed to the drive shaft (40) inserted in this hole, and is configured to rotate integrally with the drive shaft (40).

Figure 2:
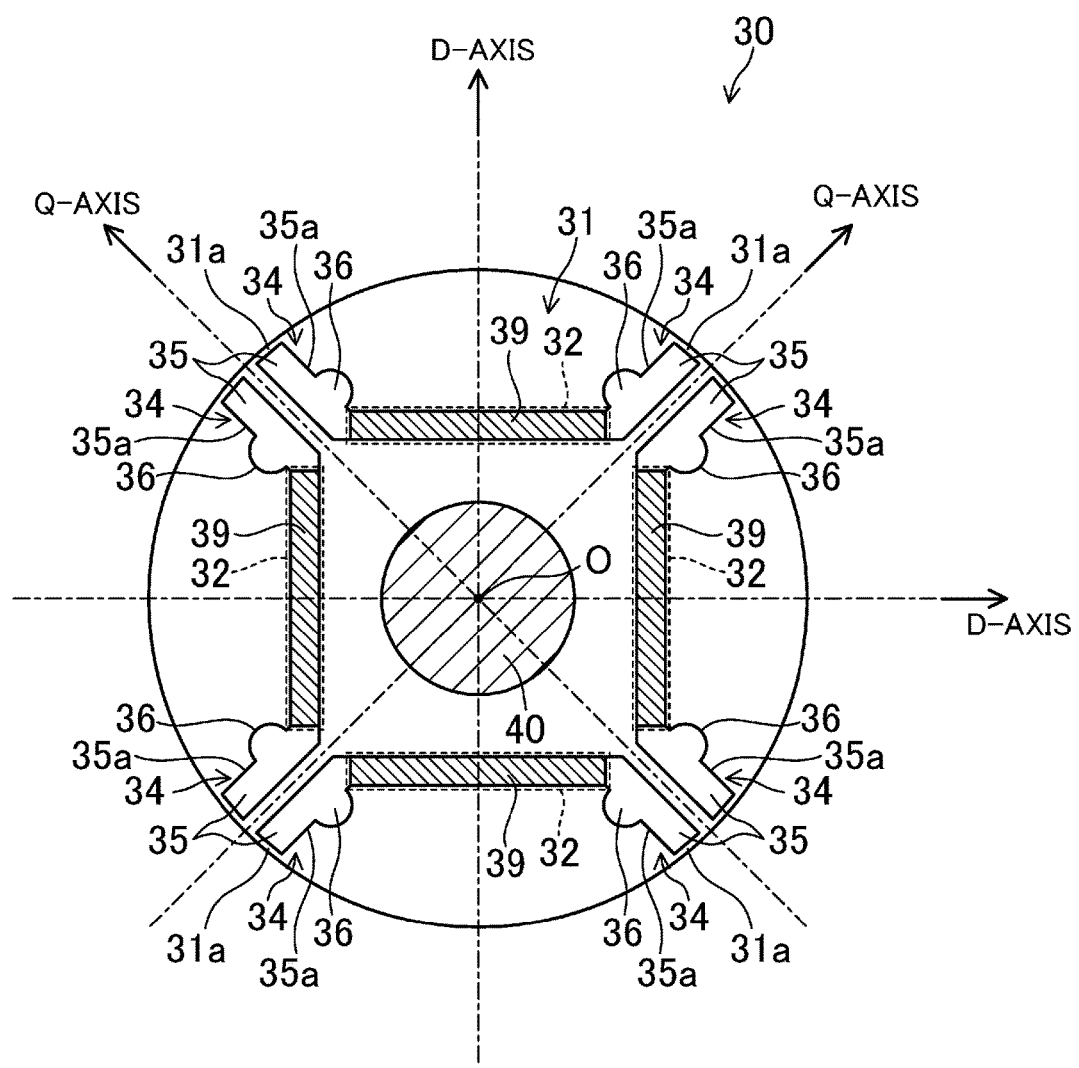
FIG. 2 illustrates the rotor and a drive shaft which are taken out from FIG. 1.

As illustrated in FIG. 2, the rotor core (31) is provided with a plurality of magnet slots (32) (equivalent to the magnet implantable holes) and a plurality of gaps (34). The magnet slots (32) and the gaps (34) are formed in the rotor core (31) such that one magnet slot (32) and two gaps (34) are provided for each magnetic pole.

The magnet slots (32) are formed in the rotor core (31) along the circumferential direction of the rotor core (31), and pass through the rotor core (31) in the axial direction. In FIGS. 1 and 2, each of the magnet slots (32) has an elongated rectangular shape when viewed from the axial direction. The magnet slots (32) are arranged around the center (O) at about 90 degree intervals. Thus, the longitudinal dimensions of the adjacent magnet slots (32) are orthogonal to each other.

The permanent magnet (39) is buried in each magnet slot (32). Specifically, the permanent magnets (39) are arranged in the respective magnet slots (32) such that adjacent permanent magnets (39) have opposite orientations of the magnetic poles with each other.

The gaps (34) are formed in the rotor core (31) at both ends in the longitudinal direction of each magnet slot (32) so as to be continuous with the each magnet slot (32). In other words, the gaps (34) are located between adjacent permanent magnets (39) buried in the rotor core (31). Specifically, the gaps (34) described in the first embodiment each have a shape comprised of a base hole (35) and a projecting hole (36).

Figure 3:
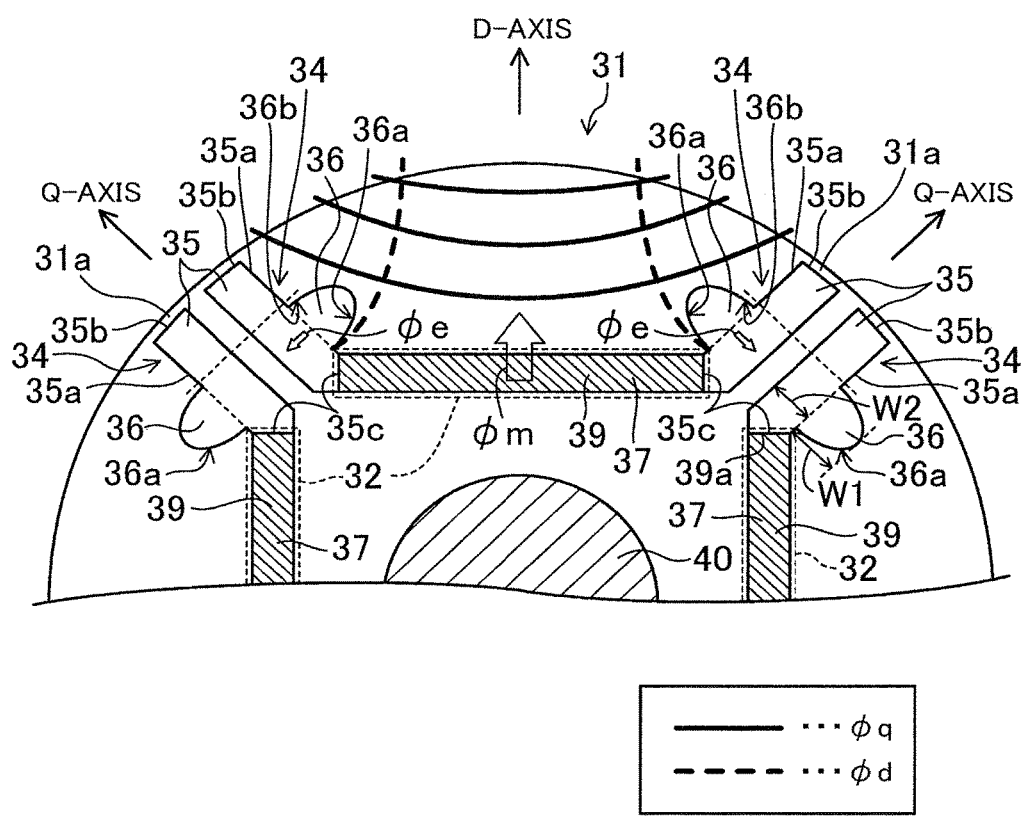
FIG. 3 is a partially-enlarged view of the rotor of FIG. 2.

As specifically illustrated in FIG. 3, the base holes (35) extend from both ends in the circumferential direction (more specifically, from both ends in the longitudinal direction) of each magnet slot (32) to the outer side of the rotor core (31), with its outer peripheral side end (35b) reaching close to the outer peripheral surface of the rotor core (31). Each of the base holes (35) is in an elongated rectangular shape extending in the radial direction, when viewed from the axial direction. The outer peripheral side end (35b) of the base hole (35) is opposed to the outer peripheral surface of the rotor core (31) with a bridge portion (31a) of the rotor core (31) interposed therebetween. Thus, the magnet slot (32) and the base holes (35) form an approximately U-shape (37) which protrudes from the outer side to the inner side of the rotor core (31) when viewed in the axial direction. It is recommended that the width of the bridge portion (31a) in the circumferential direction be appropriately determined in consideration of the mechanical strength of the rotor core (31), the magnetic flux density of the q-axis flux (described later) of the winding wires, etc.

Unlike the magnet slots (32), no magnet is buried in the base hole (35). Thus, the base hole (35) has a function as a barrier which prevents, in the rotor core (31), a short circuit of the flux caused by the permanent magnets (39).

The projecting hole (36) is formed in the rotor core (31) so as to be continuous with the base hole (35). The projecting holes (36) are holes projecting in the circumferential direction of the rotor core (31), when viewed in the axial direction, from peripheral portions (35a, 35a), opposed to each other, of the base holes (35) formed at both ends of the magnet slot (32). In other words, the projecting holes (36) are the holes projecting from the two base holes (35) associated with one magnet slot (32) toward the magnet slot (32) itself, i.e., toward the inside of the approximately U-shape (37) formed by the magnet slot (32) and the base holes (35). Two projecting holes (36) are provided for one magnetic pole generated on the rotor core (31). In other words, the projecting hole (36) is part of the base hole (35) which is expanded to the inner portion of the approximately U-shape (37). The base hole (35) and the projecting hole (36) integrally form a single gap (34).

In particular, the projecting hole (36) is located closer to the magnet slot (32) than to the outer peripheral side end (35b) of the base hole (35). More specifically, the projecting hole (36) is located at a magnet side end (35c) of the base hole (35), or located close to the magnet side end (35c) of the base hole (35). For example, the projecting hole (36) is located closer to the permanent magnet (39) than a middle portion (the thin dashed line in FIG. 3) of the length of the base hole (35) in the radial direction (i.e., the length in the longitudinal direction). The projecting hole (36) has an approximately semicircular shape when viewed in the axial direction. Thus, it can be said that if the rotor core (31) is viewed in the axial direction, the gap (34) has a shape in which part of the base hole (35) closer to the permanent magnet (39) protrudes due to the projecting hole (36), and the other part closer to the outer peripheral surface is recessed relative to the projecting hole (36).

—Effects of Gap—

The magnet torque and the reluctance torque generated on the rotor core (31) will be described first, and then effects of the above-described gap (34) will be described in detail.

Magnet flux Φm indicated by hollow arrows in FIG. 3 flows through the rotor core (31) as magnetic flux that contributes to the magnet torque. The magnet flux Φm flows from the permanent magnet (39) to the outer side of the rotor core (31) (i.e., toward the air gap G in FIG. 1). To increase the magnet torque, it is recommended to increase the magnetic flux density in the air gap G by achieving concentrated flow of magnet flux Φm toward the upper side of the permanent magnet (39) in FIG. 3 (i.e., outer side of the rotor core (31)) without dispersion of the magnet flux Φm.

Figure 4:
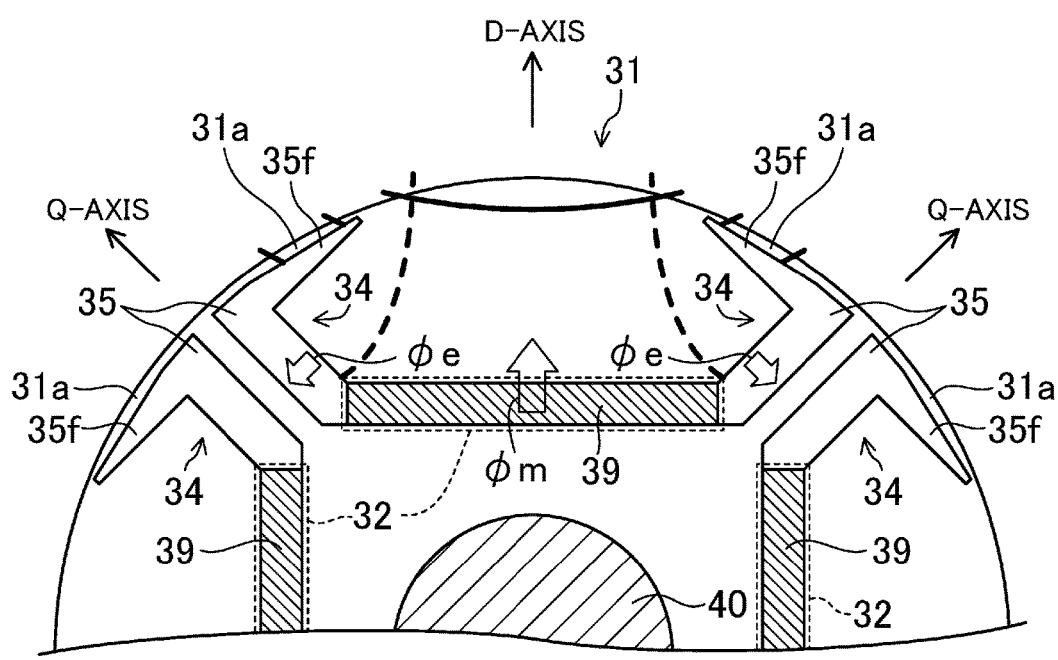
FIG. 4 is a partially-enlarged view of a known rotor.
Figure 4:
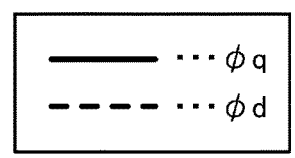

Thus, in a known technique illustrated in FIG. 4, the end of each of the base holes (35) extending from both ends of the magnet slot (32) to the outer side of the rotor core (31) is further extended along the outer peripheral surface of the rotor core (31) as a means for achieving the concentrated flow of the magnet flux Φm toward the upper side of the permanent magnet (39) (i.e., outer side of the rotor core (31)). This technique may achieve the concentrated flow of the magnet flux Φm toward the upper side of the permanent magnet (39) since the portion of the base hole (35) which extends along the outer peripheral surface of the rotor core (31) serves as a magnetic barrier.

On the other hand, the reluctance torque is also generated on the rotor core (31). As illustrated in FIG. 2, the central axis of the permanent magnet (39) is defined as a d-axis, and an axis (i.e., an axis passing between adjacent permanent magnets (39)) which is electrically and magnetically orthogonal to the d-axis is defined as a q-axis. As illustrated in FIG. 3, on the rotor core (31), q-axis flux Φq (indicated by thick solid lines in FIG. 3) generated by winding wire flows from one q-axis to the other q-axis, and d-axis flux Φd (indicated by thick dashed lines in FIG. 3) generated by winding wire flows from one d-axis to the other d-axis. The greater the difference ("Lq–Ld") between a q-axis inductance Lq of the q-axis flux Φq and a d-axis inductance Ld of the d-axis flux Φd is, the more the reluctance torque generated on the rotor core (31) increases. For this reason, to increase the reluctance torque, it is recommended to increase the q-axis flux Φq and reduce the d-axis flux Φd.

However, in FIG. 4 illustrating a known technique, a portion (35f) of the base hole (35) which serves as a magnetic barrier is located near the outer peripheral surface of the rotor core (31), which surface can also be defined as an inflow portion of the q-axis electric current Φq into the rotor core (31) (i.e., an entry point of the magnetic path to the rotor core (31)). In this configuration, the portion (35f) interrupts the flow of the q-axis flux Φq that was supposed to flow in the rotor core (31) from the air gap (G). Thus, in the configuration in FIG. 4, it is difficult to achieve satisfactory reluctance torque due to a reduction in the q-axis inductance Lq associated with a reduction in the q-axis flux Φq.

In contrast, as described earlier, the gap (34) according to the first embodiment has a shape comprised of the base hole (35) and the projecting hole (36). Specifically, as illustrated in FIG. 3, the projecting hole (36) is located closer to the magnet slot (32) than to the outer peripheral side end (35b) of the base hole (35), and is located at the magnet side end (35c) of the base hole (35) or located close to the magnet side end (35c). In other words, the projecting hole (36) of the first embodiment is not located at the inflow portion of the q-axis flux Φq in the rotor core (31). Accordingly, the flow of the q-axis flux Φq into the rotor core (31) from the air gap (G) is not prevented, which therefore avoids a reduction in the q-axis flux Φq and hence a reduction in the q-axis inductance Lq.

The projecting holes (36) of the first embodiment are the holes projecting from the two base holes (35) associated with one magnet slot (32) toward the magnet slot (32) itself, that is, toward the inside of the approximately U-shape (37) formed by the magnet slot (32) and the base holes (35), when viewed from the axial direction. Just like the base hole (35), the projecting hole (36), too, has a function as a magnetic barrier due to an increase in the magnetic reluctance. Thus, the flow of the d-axis flux Φd relating to the winding wire is restricted by the projecting hole (36) and the base hole (35). As a result, the d-axis flux Φd is reduced (indicated by thick dashed line in FIG. 3), and the d-axis inductance Ld is reduced.

Consequently, the gap (34) of the first embodiment provides a greater difference between the q-axis inductance Lq and the d-axis inductance Ld, compared to the case in FIG. 4, and greater reluctance torque, compared to the case in FIG. 4.

Turning to the magnet flux Φm, the magnet flux Φm does not disperse and is guided by the projecting hole (36) to the upper side of the permanent magnet (39) in FIG. 3 (to the outer side of the rotor core (31)) since the projecting hole (36) of the first embodiment protrudes toward the magnet slot (32) from the base hole (35) when viewed from the axial direction. Thus, a state in which the magnetic flux density in the air gap (G) is high is maintained.

Further, it can be said that the magnetic reluctance near the permanent magnet (39) is greater than in the case illustrated in FIG. 4 based on the grounds that the gap (34) of the first embodiment expands toward the permanent magnet (39) at a portion close to the permanent magnet (39), and in addition that the projecting hole (36) is formed in the rotor core (31) so as to be continuous with the base hole (35). Thus, the amount of so-called short-circuited magnetic flux leakage (indicated by "Φe" in FIG. 3), which is part of the magnet flux Φm separated from the flow of the magnet flux Φm and passing through the gap (34), is smaller than in the case illustrated in FIG. 4 (indicated by "Φe" in FIG. 4). This may prevent a reduction in the magnet torque.

Now, turning to the mechanical strength of the rotor core (31), FIG. 4 illustrates that the portion (35f) of the base hole (35) is located near the outer peripheral surface of the rotor core (31) along the outer peripheral surface of the rotor core (31). Thus, the bridge portion (31a) of the rotor core (31) has a long width, in the circumferential direction, corresponding to the portion (35f) of the base hole (35). The mechanical strength of the rotor core (31) is accordingly reduced. In this configuration, when the rotor core (31) rotates, a portion close to the bridge portion (31a) in FIG. 4 is likely to be deformed in the radial direction due to the centrifugal force of the rotation working on the rotor core (31). In contrast, in the first embodiment, as illustrated in FIG. 3, the projecting hole (36) is located at a portion of the base hole (35) close to the permanent magnet (39), not at a portion close to the outer peripheral surface of the rotor core (31). Thus, the bridge portion (31a) of the rotor core (31) of the first embodiment is shorter than that illustrated in FIG. 4, and hence the mechanical strength of the rotor core (31) is higher than in the case illustrated in FIG. 4. Consequently, even if the centrifugal force of the rotation works on the rotor core (31), the portion close to the bridge portion (31a) in FIG. 3 is less likely to be deformed in the radial direction than in the case illustrated in FIG. 4.

—Projection Length of Projecting Hole—

Now, a relationship between the above-described magnetic fluxes $\Phi q$, $\Phi d$, $\Phi m$ and $\Phi e$ and the width (i.e., the projection length (w1)) of the projecting hole (36) of the first embodiment in the circumferential direction will be described.

The projection length (w1) of the projecting hole (36) is determined according to the performance of the magnetic steel sheet forming the rotor core (31) and the performance of the permanent magnets, and further according to the magnetic flux density, the magnetic path, etc. of the respective magnetic fluxes $\Phi q$, $\Phi d$, $\Phi m$ and $\Phi e$. FIG. 3 shows an example in which the radius of the semicircular projecting hole (36) is determined such that a peripheral portion (36a) of the projecting hole (36) closer to the permanent magnet (39) is located slightly closer to the middle portion of the permanent magnet (39) relative to an end (39a) of the permanent magnet (39) in the longitudinal direction, and this radius is the projection length (w1). In other words, the projecting hole (36) is in a semicircular shape whose radius is determined so that the peripheral portion (36a) closer to the permanent magnet (39), which peripheral portion (36a) can also be regarded as a rising portion, is located slightly within the magnetic path of the magnet flux $\Phi m$.

The greater the projection length (w1) of the projecting hole (36) is, the closer the peripheral portion (36a) of the projecting hole (36) is located to the middle portion of the permanent magnet (39). This results in the expansion of the projecting hole (36), and allows further reduction of both of the short-circuited magnetic flux leakage $\Phi e$ and the d-axis flux $\Phi d$. However, too much expansion of the projecting hole (36) narrows the magnetic paths of the magnet flux $\Phi m$ and the q-axis flux $\Phi q$. This is because the projecting hole (36) further intervenes in the magnetic path of the magnet flux $\Phi m$, and because a peripheral portion (36b) of the projecting hole (36) farther from the permanent magnet (39) is close to the outer peripheral surface of the rotor core (31). In addition, if the peripheral portion (36b) of the projecting hole (36) is close to the outer peripheral surface of the rotor core (31) due to the expansion of the projecting hole (36), it results in a less distance between the outer peripheral surface of the rotor core (31) and the projecting hole (36), and hence may result in a reduction in the mechanical strength of the rotor core (31).

For the above reasons, it is recommended that the projection length (w1) of the projecting hole (36) is such a length that does not prevent the flow of the q-axis flux $\Phi q$ to the rotor core (31) and that reduces the flow of the d-axis flux $\Phi d$, and is further recommended to determine the projection length (w1) of the projecting hole (36) in consideration of a balance between the other magnetic fluxes $\Phi m$ and $\Phi e$, and the mechanical strength of the rotor core (31).

In the first embodiment, the projection length (w1) of the projecting hole (36) is greater than the width (w2) of the base hole (35) in the circumferential direction (i.e., greater than the width of the short side of the base hole (35) in FIG. 3). The magnetic reluctance of the projecting hole (36) is increased accordingly, which allows a reduction in the short-circuited magnetic flux leakage $\Phi e$.

<Effects>

The rotor core (31) of the first embodiment is provided with the magnet slots (32) and the base holes (35) extending from both ends of the respective magnet slots (32) to the outer side of the rotor core (31). That is, when viewed from the axial direction, the magnet slot (32) and the base holes (35) form a shape that protrudes to the inner side of the rotor core (31). The rotor core (31) is further provided with the projecting holes (36) each as a portion that forms the gap (34) together with the base hole (35). The projecting hole (36) projects in the circumferential direction of the rotor core (31) from each of the peripheral portions (35a, 35a), opposed to each other, of the base holes (35) provided at both ends of the magnet slot (32). Moreover, each of the projecting holes (36) is located closer to the magnet slot (32), i.e., closer to the permanent magnet (39), than to the outer peripheral side end (35b) of the base hole (35).

As described above, the projecting hole (36) is not located at a position through which the q-axis flux $\Phi q$ generated by the winding wire flows into the rotor core (31), and therefore, the q-axis flux $\Phi q$ is not reduced by the projecting hole (36). Moreover, since the projecting hole (36) projects in the circumferential direction of the rotor core (31) from each of the peripheral portions (35a, 35a), opposed to each other, of the base holes (35), the projecting hole (36) restricts the flow of the d-axis flux $\Phi d$ generated by the winding wire, and also achieves concentrated flow of the magnet flux $\Phi m$ from the permanent magnet (39) to the outer side of the rotor core (31). Thus, the magnet torque generated based on the inductance of the magnet flux $\Phi m$ is satisfactory and a reduction in the reluctance torque generated based on the inductances of the q-axis flux $\Phi q$ and the d-axis flux $\Phi d$ may be prevented.

Further, the projecting holes (36) are each located closer to the magnet slot (32) than to the outer peripheral side end (35b) of the base hole (35). Thus, the bridge portion (31a) of the rotor core (31) is shorter than that illustrated in FIG. 4, and hence the mechanical strength of the rotor core (31) is higher than in the case illustrated in FIG. 4. Consequently, even if the centrifugal force of the rotation works on the rotor core (31), the portion close to the bridge portion (31a) is less likely to be deformed in the radial direction than in the case illustrated in FIG. 4.

Further, the gap (34) is formed not only by the base hole (35) but also by the projecting hole (36). Thus, it can be said that the length of the gap (34) as a magnetic barrier is greater than in the case illustrated in FIG. 4. For this reason, the short-circuited magnetic flux leakage $\Phi e$ is less likely to occur, compared to the case in FIG. 4.

In the first embodiment, the projecting hole (36) and the base hole (35) are formed in the rotor core (31) so as to be continuous with each other. Thus, the short-circuited magnetic flux leakage $\Phi e$ may be further reduced. Moreover, since the base hole (35) and the projecting hole (36) are continuous with each other, the base hole (35) and the projecting hole (36) are easily formed in the rotor core (31) in manufacturing the rotor (30).

The projecting hole (36) of the first embodiment is in a semicircular shape without a corner, when viewed in the axial direction. This may prevent local magnetic flux saturation which can occur in the case where the projecting hole (36) is in a shape having a corner, and may also achieve smooth flow of the q-axis flux $\Phi q$ generated by the winding wire.

The rotor core (31) of the first embodiment is made of a magnetic material of which the saturated magnetic flux density is greater than or equal to 2.3 T. Thus, high torque is generated at the rotor (30) during rotation.

In the rotor core (31) of the first embodiment, the projection length (w1) of the projecting hole (36) is greater than the width (w2) of the base hole (35) in the circumferential direction. It can thus be said that the magnetic reluctance of the projecting hole (36) is increased accordingly, which allows further reduction in the short-circuited magnetic flux leakage Φe.

Second Embodiment

Figure 5:
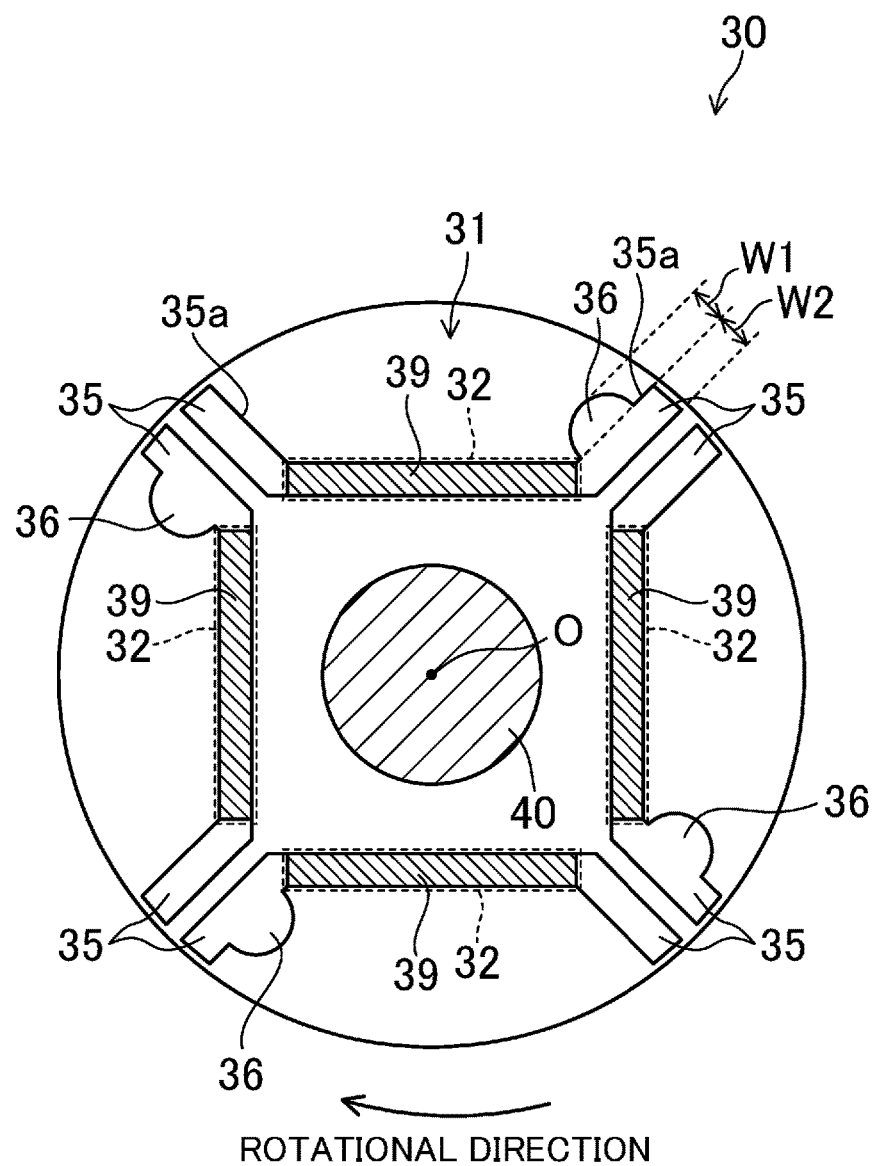
FIG. 5 is a horizontal cross-sectional view of a rotor and a drive shaft according to a second embodiment.

As typically illustrated in FIGS. 2 and 3, an example was described in the first embodiment in which the projecting holes (36) are formed so as to be associated with the two respective base holes (35) located at both ends of one magnet slot (32). In the second embodiment, as illustrated in FIG. 5, an example will be described in which one projecting hole (36) is formed so as to be associated with one of the two base holes (35) located at both ends of one magnet slot (32). That is, in the second embodiment, one projecting hole (36) is provided for one magnetic pole generated on the rotor core (31).

Specifically, as illustrated in FIG. 5, the base holes (35) are formed at both ends of one magnet slot (32), but the projecting hole (36) is formed to be associated with only the base hole (35) on the forward side in the rotational direction of the rotor core (31). The projecting hole (36) protrudes in the direction opposite the rotational direction. In FIG. 5, the projection length (w1) of the projecting hole (36) in the circumferential direction is greater than the width (w2) of the base hole (35) in the circumferential direction (i.e., greater than the width of the short side of the base hole (35) in FIG. 5).

In the configuration in FIG. 5, as well, the projection length (w1) of the projecting hole (36) in the circumferential direction is greater than the width (w2) of the base hole (35) in the circumferential direction. It can thus be said that the magnetic reluctance of the projecting hole (36) is increased accordingly, which allows a reduction in the short-circuited magnetic flux leakage Φe.

The projecting hole (36) is provided so as to be associated with only the base hole (35) on the forward side in the rotational direction of the rotor core (31). Thus, the flow of the q-axis flux Φq generated by the winding wire is not interrupted near the outer peripheral surface of the rotor core (31) corresponding to the base hole (35) on the forward side in the rotational direction of the rotor core (31). Further, the projecting hole (36) achieves concentrated flow of the magnet flux Φm from the permanent magnet (39) to the outer side of the rotor core (31). Consequently, the magnetic flux density generated in the air gap (G) may be increased, which therefore allows an increase in the magnet torque generated by the magnet flux Φm and the reluctance torque generated based on the q-axis inductance.

Note that the other configurations of the stator (20) and the rotor (30) of the second embodiment are the same as those of the first embodiment.

Third Embodiment

In the first embodiment, an example in which the base hole (35) and the projecting hole (36) are formed so as to be continuous with each other was described. In the third embodiment, as illustrated in FIG. 6, the base hole (35) and the projecting hole (36) are not continuous with each other, but are slightly apart from each other in the rotor core (31).

Figure 6:
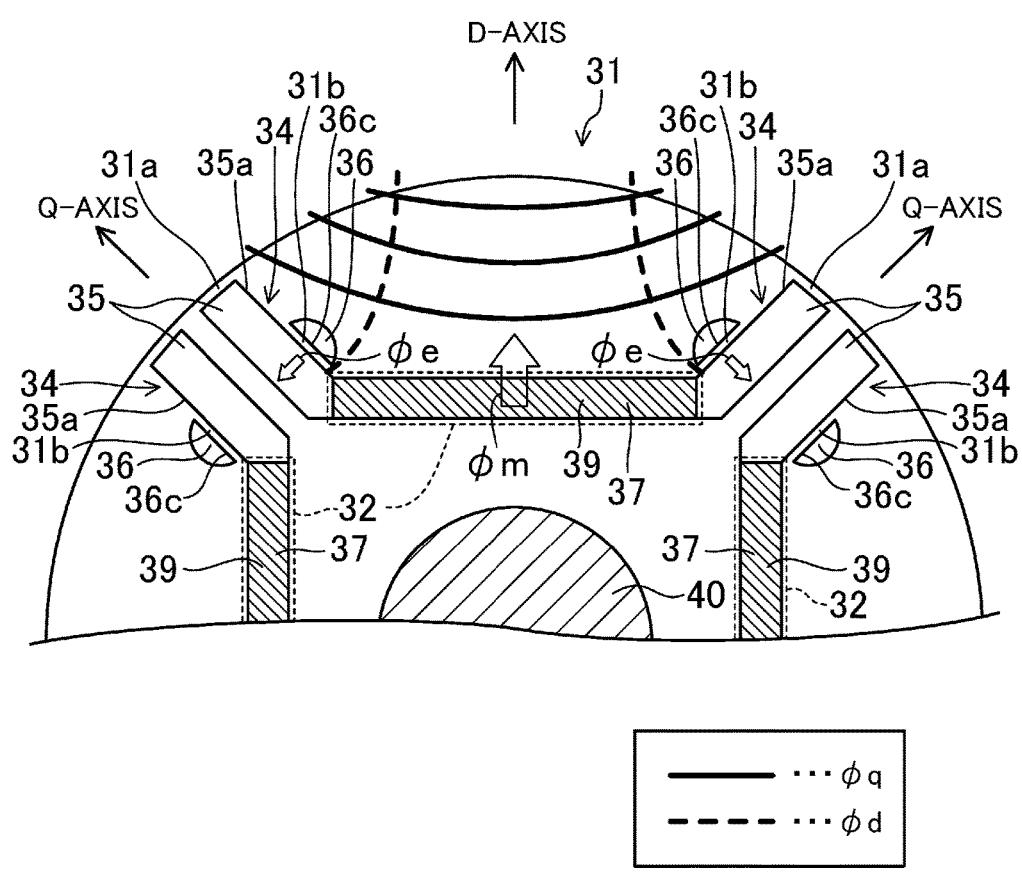
FIG. 6 is a horizontal cross-sectional view of a rotor and a drive shaft according to a third embodiment.

Specifically, the rotor core (31) illustrated in FIG. 6 has a connecting portion (31b). The connecting portion (31b) connects the peripheral portion (35a) (i.e., the peripheral portion closer to the projecting hole (36)) of the base hole (35) and a base hole side peripheral portion (36c) of the projecting hole (36) corresponding to the peripheral portion (35a). That is, the connecting portion (31b) of the rotor core (31) extends in the radial direction of the rotor core (31), which is the longitudinal direction of the base hole (35), and separates the projecting hole (36) and the base hole (35) from each other. Thus, the rotor core (31) is provided with the base hole (35) and the projecting hole (36) separated from each other by the connecting portion (31b) interposed therebetween.

Note that FIG. 6 illustrates an example in which the width of the connecting portion (31b) in the circumferential direction is much smaller than the width of the base hole (35) in the circumferential direction and the projection length of the projecting hole (36).

The larger the projecting hole (36) is, the more likely the projecting hole (36) will be deformed and expanded on the rotor core (31) toward the outer periphery side of the rotor core (31) due to the centrifugal force associated with the rotation of the rotor (30). This may also result in the expansion of the bridge portion (31a) of the rotor core (31) toward the outer periphery side of the rotor core (31). In the third embodiment, however, the connecting portion (31b) connects the end points of the semicircular projecting hole (36), so that the base hole (35) and the projecting hole (36) are formed in the rotor core (31) so as not to be continuous with each other. This configuration reduces the deformation of the projecting hole (36) due to the centrifugal force, and hence the deformation of the bridge portion (31a).

Other Embodiments

In the first to third embodiments, the shape of the projecting hole (36) is not limited to the semicircular shape. The projecting hole (36) may be in a polygonal shape such as a quadrangle, or may be in a shape surrounded by a line and a curve. As an example, the peripheral portion (36a) of the projecting hole (36) closer to the permanent magnet (39) may be formed of a line which forms approximately a 90-degree angle with the base hole (35) and makes a steep rise of the projecting hole (36), while the other peripheral portion (36b) of the projecting hole (36) may be formed of a gentle curve so as not to interrupt the magnetic path of the q-axis flux Φq.

In the first to third embodiments, the rotor core (31) may not be made of the magnetic material of which the saturated magnetic flux density is greater than or equal to 2.3 T.

In the first to third embodiments, the motor (10) may not be used as a motor of the compressor of an air conditioner. For example, the motor (10) may be used as a motor of an automobile.

In the first to third embodiments, the number of the magnetic poles generated on the rotor core (31) may be any number, and not limited to the number (four) described in the first to third embodiments, as long as it is a plural number.

In the first to third embodiments, the projection length (w1) of the projecting hole (36) may be smaller than the width (w2) of the base hole (35) in the circumferential direction.

In the first to third embodiments, an example in which both of the magnet slot (32) and the base hole (35) have a rectangular shape when viewed in the axial direction. However, the shapes of the magnet slot (32) and the base hole (35) are not limited to the rectangular shape. Further, the magnet slot (32) and the base holes (35) formed so as to be continuous with each other may form an arc shape protruding to the inner side of the rotor core (31) when viewed in the axial direction.

The rotor core (31) of the second embodiment may have the connecting portion (31b) between the projecting hole (36) and the base hole (35) just like the rotor core (31) in the third embodiment.

The projecting hole (36) of the third embodiment may be provided at only the base hole (35) located on the forward side in the rotational direction of the rotor core (31) just like the projecting hole (36) of the second embodiment.

INDUSTRIAL APPLICABILITY

As can be seen from the foregoing description, the present invention is useful as a rotor which achieves satisfactory magnet torque while avoiding a reduction in the reluctance torque generated.

DESCRIPTION OF REFERENCE CHARACTERS

30 rotor
31 rotor core
32 magnet slot (magnet implantable hole)
34 gap
35 base hole
35a peripheral portion
35b outer peripheral side end
36 projecting hole
36c base hole side peripheral portion
39 permanent magnet

The invention claimed is:

1. A rotor, comprising:
a rotor core provided with a plurality of magnet implantable holes arranged in a circumferential direction of the rotor core; and
a permanent magnet buried in each of the magnet implantable holes, wherein
the rotor core is further provided with a gap formed of base holes extending to an outer side of the rotor core from both ends, in the circumferential direction, of each of the magnet implantable holes, and a projecting hole which projects in the circumferential direction of the rotor core from at least one of peripheral portions, opposed to each other, of the base holes provided at both of the ends of each of the magnet implantable holes, when viewed in an axial direction,
each of the magnet implantable holes and the base holes form a concave shape with respect to the circumferential direction,
the projecting hole is located closer to the magnet implantable hole than to an outer peripheral side end of the base hole, and
the projecting hole is located at, or close to, a magnet side end of the base hole, on at least one of the peripheral portions, opposed to each other, of the base holes in an inside of the concave shape.

2. The rotor of claim 1, wherein the rotor core is provided with the projecting hole that is continuous with the base hole.

3. The rotor of claim 2, wherein the projecting hole has a projection length (w1) greater than a width (w2) of the base hole in the circumferential direction.

4. The rotor of claim 3, wherein the projecting hole is provided so as to be associated with only the base hole located on a forward side in a rotational direction of the rotor core, of the base holes provided at both of the ends of each of the magnet implantable holes.

5. The rotor of claim 2, wherein the projecting hole is provided so as to be associated with only the base hole located on a forward side in a rotational direction of the rotor core, of the base holes provided at both of the ends of each of the magnet implantable holes.

6. The rotor of claim 1, wherein the rotor core includes a connecting portion which connects each of the peripheral portions and a base hole side peripheral portion of the projecting hole which is associated with the peripheral portion.

7. The rotor of claim 6, wherein the projecting hole has a projection length (w1) greater than a width (w2) of the base hole in the circumferential direction.

8. The rotor of claim 7, wherein the projecting hole is provided so as to be associated with only the base hole located on a forward side in a rotational direction of the rotor core, of the base holes provided at both of the ends of each of the magnet implantable holes.

9. The rotor of claim 6, wherein the projecting hole is provided so as to be associated with only the base hole located on a forward side in a rotational direction of the rotor core, of the base holes provided at both of the ends of each of the magnet implantable holes.

10. The rotor of claim 1, wherein the projecting hole in is a semicircular shape when viewed in the axial direction.

11. The rotor of claim 10, wherein the projecting hole has a projection length (w1) greater than a width (w2) of the base hole in the circumferential direction.

12. The rotor of claim 11, wherein the projecting hole is provided so as to be associated with only the base hole located on a forward side in a rotational direction of the rotor core, of the base holes provided at both of the ends of each of the magnet implantable holes.

13. The rotor of claim 10, wherein the projecting hole is provided so as to be associated with only the base hole located on a forward side in a rotational direction of the rotor core, of the base holes provided at both of the ends of each of the magnet implantable holes.

14. The rotor of claim 1, wherein the rotor core is made of a magnetic material of which saturated magnetic flux density is greater than or equal to 2.3 T.

15. The rotor of claim 14, wherein the projecting hole has a projection length (w) greater than a width (w2) of the base hole in the circumferential direction.

16. The rotor of claim 15, wherein the projecting hole is provided so as to be associated with only the base hole located on a forward side in a rotational direction of the rotor core, of the base holes provided at both of the ends of each of the magnet implantable holes.

17. The rotor of claim 14, wherein the projecting hole is provided so as to be associated with only the base hole located on a forward side in a rotational direction of the rotor core, of the base holes provided at both of the ends of each of the magnet implantable holes.

18. The rotor of claim 1, wherein the projecting hole has a projection length (w1) greater than a width (w2) of the base hole in the circumferential direction.

19. The rotor of claim 18, wherein the projecting hole is provided so as to be associated with only the base hole located on a forward side in a rotational direction of the rotor core, of the base holes provided at both of the ends of each of the magnet implantable holes.

20. The rotor of claim 1, wherein the projecting hole is provided so as to be associated with only the base hole located on a forward side in a rotational direction of the rotor core, of the base holes provided at both of the ends of each of the magnet implantable holes.

\* \* \* \* \*